(12) United States Patent
Hasegawa et al.

(10) Patent No.: US 11,156,529 B2
(45) Date of Patent: Oct. 26, 2021

(54) NONLINEARITY MEASURING METHOD AND NONLINEARITY MEASURING DEVICE

(71) Applicant: SUMITOMO ELECTRIC INDUSTRIES, LTD., Osaka (JP)

(72) Inventors: Takemi Hasegawa, Osaka (JP); Tetsuya Hayashi, Osaka (JP)

(73) Assignee: SUMITOMO ELECTRIC INDUSTRIES, LTD., Osaka (JP)

(*) Notice: Subject to any disclaimer, the term of this patent is extended or adjusted under 35 U.S.C. 154(b) by 84 days.

(21) Appl. No.: 16/662,499

(22) Filed: Oct. 24, 2019

(65) Prior Publication Data

US 2020/0056958 A1 Feb. 20, 2020

Related U.S. Application Data

(63) Continuation of application No. PCT/JP2018/018333, filed on May 11, 2018.

(30) Foreign Application Priority Data

May 11, 2017 (JP) .............................. JP2017-094730

(51) Int. Cl.
  *G01M 11/00* (2006.01)
  *G02B 6/02* (2006.01)
  *G01M 11/08* (2006.01)

(52) U.S. Cl.
  CPC ........ *G01M 11/31* (2013.01); *G01M 11/3109* (2013.01); *G02B 6/02042* (2013.01); (Continued)

(58) Field of Classification Search
  CPC .... G01M 11/088; G01M 11/30; G01M 11/31; G01M 11/3109; G01M 11/3118;
  (Continued)

(56) References Cited

U.S. PATENT DOCUMENTS 5,724,126 A * 3/1998 Nishi ................. G01M 11/3181
 356/73.1
7,020,360 B2 * 3/2006 Satomura ........... G01M 11/3163
 356/73.1
(Continued)

FOREIGN PATENT DOCUMENTS

EP 0959337 A2 11/1999
FR 2751746 A1 1/1998

OTHER PUBLICATIONS

Macho Andres et al, "Impact of inter-core crosstalk in radio-over-fiber transmission on multi-core optical media", Proceedings of SPIE; Proceedings of SPIE ISSN 0277-786X vol. 10524, SPIE, US, vol. 9772, Feb. 12, 2016, p. 977200, XP060070156.
(Continued)

*Primary Examiner* — Gordon J Stock, Jr.
(74) *Attorney, Agent, or Firm* — Faegre Drinker Biddle & Reath LLP (57) ABSTRACT

The present invention relates to a method and device for measuring optical nonlinearity of an optical fiber to be measured comprising a plurality of cores having mutually coupled waveguide modes. The method includes, at least, preparing a laser light source emitting laser light and a detecting unit determining an optical intensity, inputting laser light into a specific core of the optical fiber to be measured, determining the intensity of a specific wavelength component caused by optical nonlinearity among the reflective light components from the optical fiber to be measured, and determining optical nonlinearity of the optical fiber to be measured on the basis of the intensity of the specific wavelength component.

5 Claims, 4 Drawing Sheets

(52) U.S. Cl.
CPC ....... *G01M 11/088* (2013.01); *G01M 11/3172* (2013.01); *G01M 11/39* (2013.01); *G02B 6/02009* (2013.01)

(58) Field of Classification Search
CPC ......... G01M 11/3127; G01M 11/3136; G01M 11/3145; G01M 11/3154; G01M 11/3163; G01M 11/3172; G01M 11/3181; G01M 11/319; G01M 11/39; G02B 6/02009; G02B 6/02042
USPC ........................................................ 356/73.1
See application file for complete search history.

(56) References Cited

U.S. PATENT DOCUMENTS

| | | | | |
|---|---|---|---|---|
| 7,504,618 | B2* | 3/2009 | Hartog | G01J 3/4412 250/227.14 |
| 7,869,014 | B2* | 1/2011 | Tadakuma | G01M 11/3181 356/73.1 |
| 10,690,483 | B2* | 6/2020 | Horikx | G01M 11/3172 |
| 10,760,993 | B2* | 9/2020 | Maruyama | G01M 11/3109 |
| 2003/0128946 | A1* | 7/2003 | Glingener | G01M 11/319 385/123 |
| 2004/0061846 | A1* | 4/2004 | Elbers | G01M 11/3109 356/73.1 |
| 2005/0117830 | A1* | 6/2005 | Hartog | H04B 10/071 385/12 |
| 2008/0013162 | A1 | 1/2008 | Shukunami et al. | |
| 2011/0274398 | A1* | 11/2011 | Fini | G02B 6/02042 385/124 |
| 2013/0183016 | A1* | 7/2013 | Imamura | G02B 6/02042 385/127 |
| 2013/0251320 | A1* | 9/2013 | Hayashi | G02B 6/4401 385/100 |
| 2014/0036258 | A1 | 2/2014 | Nakamura et al. | |

OTHER PUBLICATIONS

Hayashi, Tetsuya et al., "Coupled-Core Multi-Core Fibers: High-Spatial-Density Optical Transmission Fibers with Low Differential Modal Properties," Proc. ECOC 2015, We.1.4.1, 2015.

* cited by examiner

NONLINEARITY MEASURING METHOD AND NONLINEARITY MEASURING DEVICE

CROSS-REFERENCE TO RELATED APPLICATIONS

This application is a continuation application of PCT/JP2018/018333 claiming the benefit of priority of the Japanese Patent Application No. 2017-094730 filed on May 11, 2017, the entire contents of which are incorporated herein by reference.

TECHNICAL FIELD

The present invention relates to a nonlinearity measuring method and a nonlinearity measuring device for measuring optical nonlinearity of a spatially-multiplexed optical fiber to be measured having a plurality of coupled spatial modes.

BACKGROUND ART

A spatial division multiplexing fiber (SDMF) having a plurality of spatial modes (a plurality of cores and/or a plurality of waveguide modes) in one optical fiber can increase the spatial density of the amount of transmitted information. Thus, the SDMF is expected as a technique for enhancing the use efficiency of the area of a limited communication path such as underground conduit and undersea cable.

For example, a coupled-core multi core fiber (CC-MCF) in which the waveguide modes are coupled among a plurality of cores is such that mutual intervals are short among the plurality of cores and thus an effect of enhancing the spatial density of the amount of transmitted information is high. A multi-input multi-output (MIMO) signal processing technique for discriminating the signals in a plurality of waveguide modes propagating in a plurality of coupled cores is used together so that the CC-MCF enables transmission at high density and at large capacity.

In particular, the intensity of coupling among a plurality of cores in the CC-MCF is appropriately set and random mode coupling is caused due to bending or twisting of the CC-MCF so that the speed of accumulating the differential mode delays (DMD) between the modes is reduced to ½ square of the fiber length. The optical fiber is advantageous in restricting the MIMO processing cost.

The optical fiber is called coupled-mode coupled-core multi core fiber (CM-CC-MCF), and is disclosed in Non-Patent Document 1. The CM-CC-MCF typically has an inter-core mode coupling coefficient of 1 $m^{-1}$ or more or an inter-core power coupling coefficient of 10 $km^{-1}$ or more.

As compared with a single-core optical fiber currently and widely used as an optical transmission path of an optical transmission system, the CM-CC-MCF is important in higher spatial density of the cores, and is important in a reduction in optical nonlinearity due to the presence of light dispersed in a plurality of cores by mode coupling.

Additionally, the "optical nonlinearity phenomenon" indicates a general phenomenon caused by a change in the refractive index of a medium due to an optical electric field, and a degree of the likelihood of an optical nonlinearity phenomenon in a medium is called "optical nonlinearity." A nonlinearity refractive index $n_2$ as a refractive index change component proportional to the optical intensity corresponding to the square of an optical electric field is dominant in the widely-used silica-based optical fiber in terms of optical nonlinearity. Further, the optical intensity in a mode guided to a core of an optical fiber has a spatially non-uniform distribution. However, the equivalent optical intensity $P/A_{eff}$ can be derived on the basis of the power P of the light guided to the core by use of the effective area $A_{eff}$. Therefore, it is convenient and general to use the nonlinearity constant $\gamma = k(n_2/A_{eff})$, as the evaluation index indicating the optical nonlinearity of an optical fiber, instead of the nonlinearity refractive index $n_2$. Here, k is a wavenumber of guide light.

A nonlinearity optical phenomenon such as self-phase modulation, cross-phase modulation or four-wave mixing is caused by optical nonlinearity indicated by the nonlinearity constant $\gamma$. A transmission signal is distorted by the nonlinearity optical phenomenon, a nonlinear noise is caused by the distorted signal, and an optical signal to noise ratio (OSNR) of a transmission system lowers by the nonlinear noise. If the OSNR of the transmission system then lowers, the actual transmission capacity lowers below an ideal value. The value of the transmission system consequently lower. Thus, it is important to measure optical nonlinearity of an optical fiber and to design and construct a transmission system based on the measurement result.

CITATION LIST

Non Patent Literature

Non-Patent Document 1: Tetsuya Hayashi, et al., "Coupled-Core Multi-Core Fibers: High-Spatial-Density Optical Transmission Fibers with Low Differential Modal Properties." Proc. ECOC 2015, We.1.4.1 (2015)

SUMMARY OF INVENTION

Technical Problem

The present inventors have found the following problem as a result of the study of the above background art. That is, the self-phase modulation method is known as one general method for measuring optical nonlinearity of a conventional single-core optical fiber. In the self-phase modulation method, measurement light with already-known optical power is incident at one end of an optical fiber to be measured, and the spectrum of the measurement light emitted at the other end of the optical fiber to be measured is analyzed. In the spectrum analysis, weak light newly caused in the optical fiber to be measured by self-phase modulation is separated from the emitted measurement light and quantified. Thereby, a nonlinearity constant $\gamma$ of the optical fiber to be measured can be determined. The nonlinearity measuring methods such as cross-phase modulation method and four-wave mixing method are also known. The conventional measuring methods for measuring optical nonlinearity are not essentially different in that measurement light is incident at one end of an optical fiber and the measurement light emitted at the other end of the optical fiber is analyzed.

However, the above conventional measuring methods for measuring optical nonlinearity are difficult to apply to measure optical nonlinearity of a CM-CC-MCF. This is because light incident into one core at the incident end of a CM-CC-MCF having a plurality of cores is subjected to inter-core mode coupling, and is dispersed and emitted from the plurality of cores at the exit end. Further, if only light emitted from any one core among the plurality of cores at the exit end of the CM-CC-MCF is observed, the observation result is not stable. This is because mode coupling randomly varies in the CM-CC-MCF due to a variation in temperature of the CM-CC-MCF or wavelength of the measurement light.

The above problem of mode coupling can be avoided by observing the electric fields of the pieces of measurement light emitted from all the cores at the exit end of the CM-CC-MCF at the same time. However, a spectrometer needs to be larger in its size for extracting a self-phase modulation component by analyzing the spectra of the pieces of measurement light observed at the same time, and thus the pieces of measurement light are not easy to observe at the same time.

The present invention has been made in order to solve the above problem, and is directed to provide a nonlinearity measuring method and a nonlinearity measuring device capable of easily measuring optical nonlinearity of an optical fiber to be measured including a plurality of cores having mutually coupled waveguide modes in a simple configuration.

Solution to Problem

A nonlinearity measuring method according to the present invention is a step of measuring an optical fiber including a first end, a second end opposing the first end, a plurality of cores extending between the first end and the second end and having mutually coupled waveguide modes, and a single cladding surrounding the plurality of cores, and for enabling optical nonlinearity of the optical fiber to be measured to be measured, and includes at least a preparing step, a light launching step, a light detecting step, and an analyzing step. The preparing step is a step of preparing a laser light source and a detecting unit each optically connected to any one specific core among the plurality of cores at the first end of the optical fiber to be measured. The light launching step is a step of inputting laser light (measurement light) from the laser light source into the specific core at the first end. The light detecting step is a step of causing light (backward propagation light) emitted from the specific core at the first end in response to the laser light incident into the specific core to be received by the detecting unit. Further, the light detecting step is a step of determining the intensity of a specific wavelength component caused by optical nonlinearity of the optical fiber to be measured among the wavelength components included in the light received by the detecting unit. The analyzing step is a step of determining optical nonlinearity of the optical fiber to be measured on the basis of the intensity of the specific wavelength component.

Advantageous Effects of Invention

According to the present invention, it is possible to easily measure optical nonlinearity of an optical fiber to be measured including a plurality of cores having mutually coupled waveguide modes in a simple configuration.

DESCRIPTION OF EMBODIMENTS

Description of Embodiment of the Present Invention

The contents of an embodiment of the present invention will be first described individually.

(1) A nonlinearity measuring method according to the present embodiment is directed for measuring an optical fiber including a first end, a second end opposing the first end, a plurality of cores extending between the first end and the second end and having mutually coupled waveguide modes, and a single cladding surrounding the plurality of cores, and enables optical nonlinearity of the optical fiber to be measured to be measured. The nonlinearity measuring method includes, as one aspect, at least a preparing step, a light launching step, a light detecting step, and an analyzing step. In the preparing step, a laser light source and a detecting unit, which are each optically connected to any one specific core of the plurality of cores at the first end of the optical fiber to be measured, are prepared. In the light launching step, laser light from the laser light source is incident into the specific core from the first end. In the light detecting step, light, which is emitted from the specific core at the first end in response to the laser light incident into the specific core, is received by the detecting unit. Further, in the light detecting step, the intensity of a specific wavelength component caused by optical nonlinearity of the optical fiber to be measured among the wavelength components included in the light received by the detecting unit is determined. In the analyzing step, optical nonlinearity of the optical fiber to be measured is determined on the basis of the intensity of the specific wavelength component.

(2) As one aspect of the present embodiment, the nonlinearity measuring method may further include an incident light power measuring step of measuring power of laser light which is emitted from the laser light source and is incident into the specific core in the light launching step. In this case, in the analyzing step, the optical nonlinearity of the optical fiber to be measured is determined on the basis of the intensity of the specific wavelength component and the power of the laser light.

(3) As one aspect of the present embodiment, an optical path between the laser light source and the first end of the optical fiber to be measured, and an optical path between the detecting unit and the first end may be partially common by use of a reference optical fiber having already-known optical nonlinearity. In the configuration in which the reference optical fiber for the common optical paths is arranged, laser light reaching the first end from the laser light source via the reference optical fiber is incident into the specific core from the first end in the light launching step. On the other hand, in the light detecting step, light emitted from the specific core at the first end of the optical fiber to be measured is received by the detecting unit via the reference optical fiber. In the analyzing step, the optical nonlinearity of the optical fiber to be measured is determined as a relative value for the already-known optical nonlinearity of the reference optical fiber.

(4) As one aspect of the present embodiment, pulse laser light as laser light may be incident into the specific core from the first end in the light launching step, and a temporal change in the intensity of the specific wavelength component may be determined in the light detecting step. In this case, in the analyzing step, optical nonlinearity at each position in the longitudinal direction of the optical fiber to be measured is determined on the basis of the temporal change in the intensity of the specific wavelength component.

(5) A nonlinearity measuring device according to the present embodiment is directed for realizing the nonlinearity measuring method, and, as one aspect, includes at least a laser light source, a detecting unit, and an analyzing unit. An optical fiber (optical fiber to be measured) including a first end, a second end opposing the first end, a plurality of cores extending between the first end and the second end and having mutually coupled waveguide modes, and a single cladding surrounding the plurality of cores is to be measured. The laser light source is optically connected to any one specific core among the plurality of cores at the first end of the optical fiber to be measured. Further, the laser light source emits laser light to be incident into the specific core from the first end. The detecting unit is optically connected to the specific core at the first end of the optical fiber to be measured. Further, the detecting unit receives light emitted from the specific core at the first end in response to the laser light incident into the specific core. Furthermore, the detecting unit determines the intensity of a specific wavelength component caused by optical nonlinearity of the optical fiber to be measured among the wavelength components included in the received light. The analyzing unit deter wines optical nonlinearity of the optical fiber to be measured on the basis of the intensity of the specific wavelength component.

Each aspect described in [Description of embodiment of the present invention] described above is applicable to each of all the remaining aspects or combinations of all the remaining aspects.

Details of Embodiment of the Present Invention

A specific configuration of the nonlinearity measuring method and the nonlinearity measuring device according to the present embodiment will be described below in detail with reference to the accompanying drawings. The present invention is not limited to the examples, and is intended to include all the changes in the meanings and range equivalent to those in CLAIMS described in CLAIMS. Further, the same components in the description of the drawings are denoted with the same reference numerals, and a repeated description thereof will be omitted.

Assuming a general nonlinearity constant γ as an evaluation index indicating optical nonlinearity of an optical fiber, the nonlinearity constant γ is defined in the above Equation $k(n_2/A_{eff})$. The wavenumber k in the Equation indicates a wavelength of measurement light, and is already-known. $n_2$ is already-known by the material of the cores in the optical fiber to be measured. The effective area $A_{eff}$ is unknown. In the CM-CC-MCF, the nonlinearity lowers due to the mode coupling as described above, and thus the effective area $A_{eff}$ is equivalently influenced by the mode coupling. Further, the mode coupling is influenced by bending or twisting applied to the CM-CC-MCF. Therefore, the effective area $A_{eff}$ is more difficult to expect in advance than in a single-core optical fiber.

Brillouin scattering due to acoustic waves in glass is also one nonlinearity optical effect caused in inverse proportion to the effective area $A_{eff}$. However, Brillouin scattering causes a frequency shift corresponding to the frequency of the acoustic waves unlike the effects of the nonlinearity constant γ. The frequency shift is about 10 GHz for silica glass. This is a slight difference for the optical frequency.

Thus, it can be assumed that the mode coupling of Brillouin backscattering light caused from the measurement light incident into the optical fiber to be measured is caused in the same way as the mode coupling of the measurement light is caused. The nonlinearity measuring method and the nonlinearity measuring device according to the present embodiment described below determine the optical nonlinearity of the optical fiber to be measured on the basis of the intensity of Brillouin backscattering light (backward propagation light) caused in the optical fiber to be measured.

Figure 1:
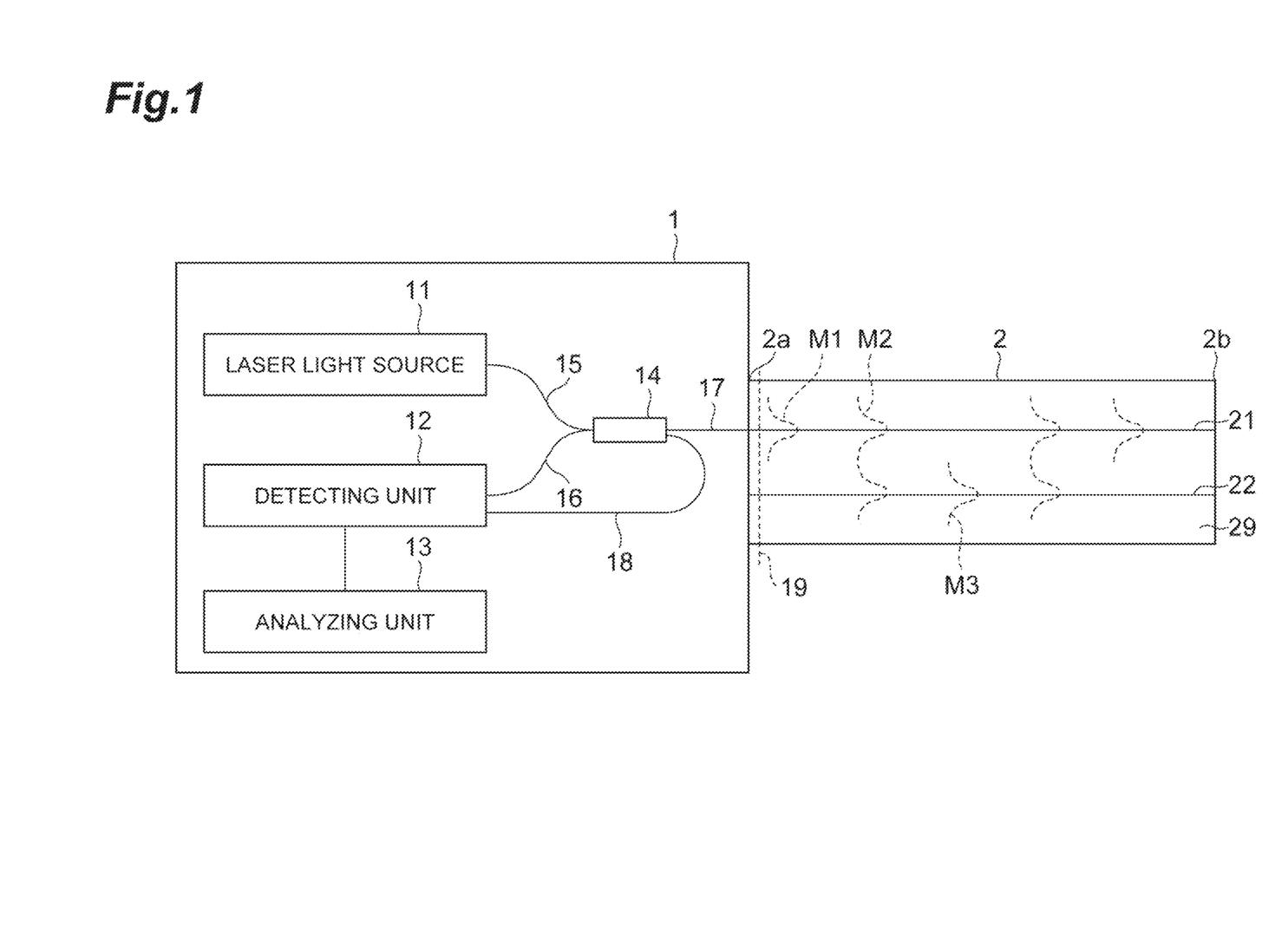
FIG. 1 is a diagram illustrating an exemplary configuration of a measuring system using a nonlinearity measuring device 1 according to the present embodiment.
Figure 2:
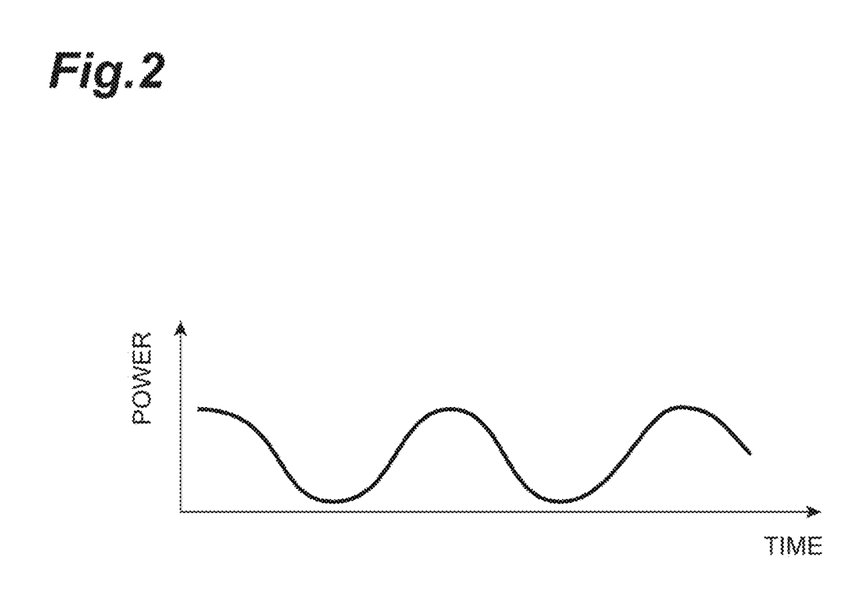
FIG. 2 is a diagram illustrating an exemplary power distribution of Brillouin backscattering light in the longitudinal direction of an optical fiber 2 to be measured.
Figure 3:
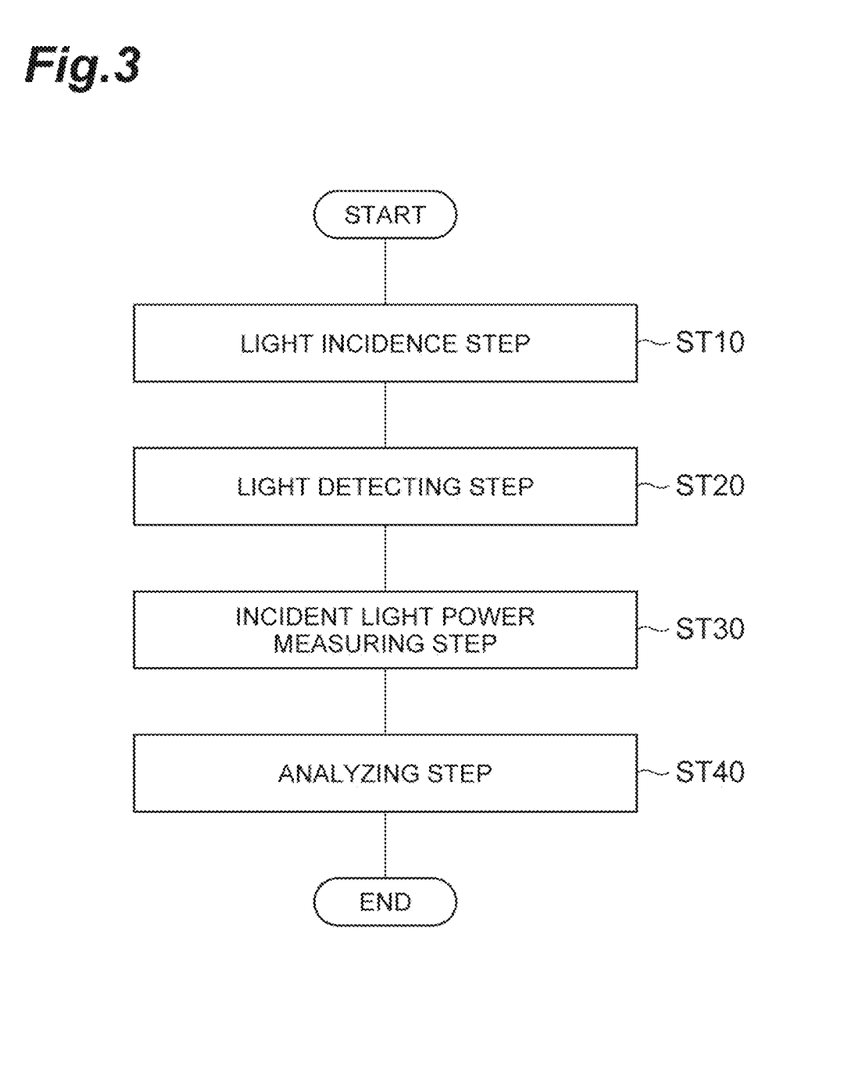
FIG. 3 is a flowchart for explaining an exemplary nonlinearity measuring method according to the present embodiment.

FIG. 1 is a diagram illustrating an exemplary configuration of a measuring system (exemplary configuration for measuring power of measurement light) using a nonlinearity measuring device 1 according to the present embodiment. FIG. 2 is a diagram illustrating an exemplary power distribution of Brillouin backscattering light in the longitudinal direction of an optical fiber 2 to be measured. Further, FIG. 3 is a flowchart for explaining an exemplary nonlinearity measuring method according to the present embodiment.

The nonlinearity measuring device 1 is directed for measuring optical nonlinearity of the optical fiber 2 to be measured, and includes a laser light source 11, a detecting unit 12, an analyzing unit 13, and an optical coupler 14. The optical coupler 14 is optically connected to each of the laser light source 11, the detecting unit 12, and a specific core (core into which measurement light is incident among the cores illustrated in FIG. 1) 21 in the optical fiber 2 to be measured via a plurality of optical fibers 15 to 18. That is, the laser light source 11 is optically connected to the specific core 21 in the optical fiber 2 to be measured via the optical fiber 15, the optical coupler 14, and the optical fiber 17, and the detecting unit 12 is optically connected to the specific core 21 in the optical fiber 2 to be measured via the optical fiber 16, the optical coupler 14, and the optical fiber 17 (preparing step).

The optical fiber 15 is a transmission path for propagating measurement light emitted from the laser light source 11 to the optical coupler 14, and is optically connected at one end to the light exit end of the laser light source 11 and is optically connected at the other end to the optical coupler 14. The optical fiber 16 is a transmission path for propagating Brillouin backscattering light routed through the optical coupler 14 to the detecting unit 12, and is optically connected at one end to the incident end of the detecting unit 12 and is optically connected at the other end to the optical coupler 14. The optical fiber 17 is a transmission path for propagating the measurement light routed through the optical coupler 14 and the Brillouin backscattering light emitted from the specific core 21 in the optical fiber 2 to be measured in the mutually, reverse directions, and is optically connected at one end to the specific core 21 and is optically connected at the other end to the optical coupler 14.

In the exemplary configuration illustrated in FIG. 1, the optical fiber 18 for guiding the measurement light routed through the optical coupler 14 to the detecting unit 12 is disclosed in a configuration (incident light power measuring step ST30) in which power of the measurement light incident into the optical fiber 2 to be measured (incident light power) is directly monitored by the detecting unit 12. As described below, however, the optical fiber 18 is not required in a configuration in which the incident light power is measured by a different detecting unit from the detecting unit 12 or a configuration in which the incident light power measuring step ST30 is not performed.

The optical fiber 2 to be measured is a CC-MCF including a first end 2a, a second end 2b opposing the first end 2a, a plurality of cores 21, 22 extending between the first end 2a and the second end 2b and having mutually coupled waveguide modes, and a single cladding 29 surrounding the plurality of cores 21, 22. The optical fiber 2 to be measured may be a CM-CC-MCF with an inter-core mode coupling coefficient of 1 m$^{-1}$ or more or an inter-core power coupling coefficient of 10 km$^{-1}$ or more. Additionally, the optical fiber 2 to be measured includes two or more cores, but only the two cores 21 and 22 among the two or more cores are illustrated in the example of FIG. 1.

In the nonlinearity measuring device 1 illustrated in FIG. 1, the laser light source 11 outputs laser light (measurement light) for measuring the optical nonlinearity of the optical fiber 2 to be measured. The laser light source 11 preferably outputs laser light with a single optical frequency, and preferably outputs pulse laser light.

The optical coupler 14 is optically connected to the laser light source 11 via the optical fiber 15, is optically connected to the detecting unit 12 via the optical fiber 16, and is optically connected to the core (specific core) 21 at the first end 2a of the optical fiber 2 to be measured via the optical fiber 17. In the light launching step ST10, laser light outputted from the laser light source 11 propagates through the optical fiber 15, the optical coupler 14, and the optical fiber 17 in this order, and is incident into the core 21 at the first end 2a of the optical fiber 2 to be measured.

In the example of FIG. 1, the specific core 21 into which laser light is incident from the first end 2a and the other core 22 are disclosed as the plurality of cores of the optical fiber 2 to be measured. Waveguide mode coupling is caused between the specific core 21 and the other core 22, and thus laser light propagates as mode M1 locally present in the core 21 in a section in the longitudinal direction of the optical fiber 2 to be measured, propagates as mode M2 dispersed in a plurality of cores in another section, and propagates as mode M3 locally present in the core 22 in still another section.

Laser light propagates through the cores in the optical fiber 2 to be measured, and thus Brillouin scattering is caused and Brillouin backscattering light is caused at each position in the longitudinal direction. The optical frequency of the Brillouin backscattering light is lower than the optical frequency of the laser light outputted from the laser light source 11, but its frequency shift is vanishingly low. Thus, the reciprocity of waveguide mode coupling (or mutually-reverse propagations cause the original path to be routed) is established. Backscattering light caused at each position of the optical fiber 2 to be measured is outputted from the core 21 at the first end 2a and returns to the optical fiber 17 due to the reciprocity of waveguide mode coupling.

Brillouin backscattering light outputted from the specific core 21 at the first end 2a of the optical fiber 2 to be measured propagates via the optical fiber 17, the optical coupler 14, and the optical fiber 16 in this order, and is received by the detecting unit 12. In the light detecting step ST20, the detecting unit 12 determines the intensity of a specific wavelength component (Brillouin backscattering light component) caused by the optical nonlinearity of the optical fiber 2 to be measured among the wavelength components included in the received light. The detecting unit 12 has optical frequency selectivity and high-speed responsivity, and detects a temporal change in the power of the backscattering light caused by Brillouin scattering. In the exemplary configuration illustrated in FIG. 1, part of the laser light passing through the optical coupler 14 is received by the detecting unit 12 via the optical fiber 18 and the power of the laser light is determined (incident light power measuring step ST30).

In the analyzing step ST40, the analyzing unit 13 determines the optical nonlinearity of the optical fiber 2 to be measured on the basis of the intensity of the Brillouin backscattering light determined by the detecting unit 12. Even if the waveguide mode coupling randomly varies in the optical fiber 2 to be measured, the intensity of the Brillouin backscattering light emitted from the specific core 21 at the first end 2a of the optical fiber 2 to be measured is constant. The nonlinearity measuring device 1 and the nonlinearity measuring method according to the present embodiment are different in the point from the conventional techniques based on the transmissive method. Therefore, the optical nonlinearity of the optical fiber 2 to be measured including the plurality of cores having mutually coupled waveguide modes can be easily measured in a simple configuration according to the present embodiment.

Further, according to the present embodiment, the power of the Brillouin backscattering light outputted from the core 21 at the first end 2a of the optical fiber 2 to be measured is measured as a time function as illustrated in FIG. 2. Thereby, the Brillouin scattering occurrence efficiency at each position in the longitudinal direction of the optical fiber 2 to be measured, or the local effective area $A_{\textit{eff}}$ at each position in the longitudinal direction of the optical fiber 2 to be measured can be determined. By way of example, it is known that Brillouin scattering is one nonlinearity optical effect caused in inverse proportion to the effective area $A_{\textit{eff}}$, and a relationship of $P_{OUT} = k_p \cdot (P_{IN}/A_{\textit{eff}})$ ($k_p$ is a already-known proportional constant) is established between the intensity $P_{OUT}$ of the Brillouin backscattering light obtained in the detecting unit 12 and incident light power $P_{IN}$ emitted from the laser light source 11. Therefore, if the effective area $A_{\textit{eff}}$ is determined by the relationship between the intensity $P_{OUT}$ of the Brillouin backscattering light and the incident light power $P_{IN}$, the nonlinearity constant γ can be consequently determined as the optical nonlinearity of the optical fiber 2 to be measured.

In order to determine the absolute value of the effective area $A_{\textit{eff}}$, the information on the power of laser light (incident light power) incident into the optical fiber 2 to be measured is required. Thus, in the incident light power measuring step ST30, the power of laser light incident into the specific core 21 is measured. An optical branching device is inserted on an optical path between the laser light source 11 and the optical fiber 2 to be measured thereby to measure the incident light power. In the exemplary configuration illustrated in FIG. 1, the optical coupler 14 functions as a branching device. Further, in other than the configuration in which the incident light power is directly monitored like the exemplary configuration illustrated in FIG. 1, the incident light power measuring step ST30 can be performed. For example, the incident light power measuring step ST30 can be performed by cutting the optical fiber 2 to be measured at an end and measuring the power of laser light arriving from the laser light source 11 (incident light power) at a position indicated in a broken line 19 of FIG. 1 after the Brillouin backscattering light intensity measurement (light detecting step ST20) by the detecting unit 12.

The incident light power measuring step ST30 is not necessarily required for obtaining the information on the power of laser light incident into the optical fiber 2 to be measured. For example, a laser output can be measured on the basis of the information on a drive current or saturation characteristics of the laser light source 11. Further, the optical nonlinearity of the optical fiber 2 to be measured can be determined by use of an optical fiber having an already-known optical nonlinearity or an already-known $A_{\textit{eff}}$.

Figure 4:
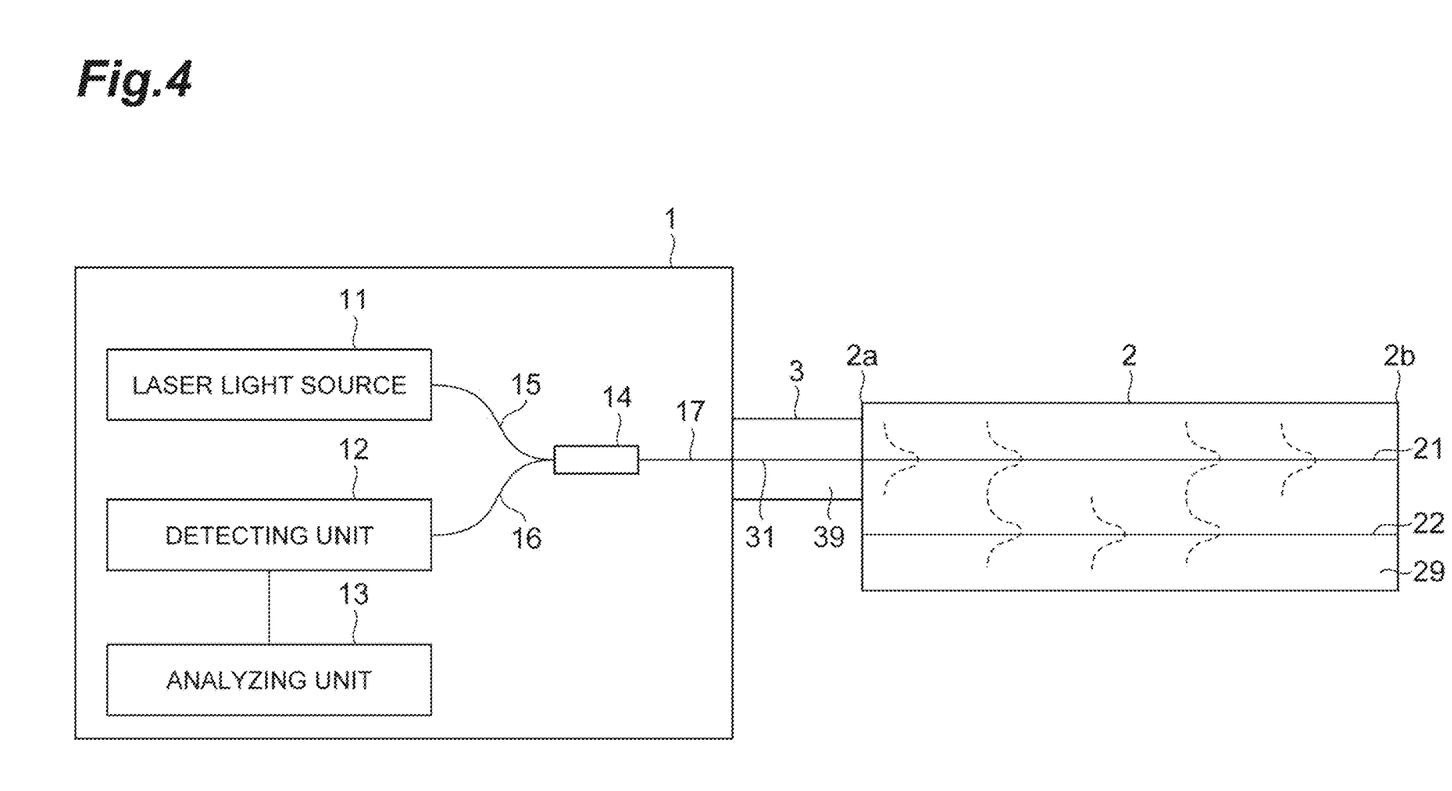
FIG. 4 is a diagram illustrating another exemplary configuration of the measuring system using the nonlinearity measuring device 1 according to the present embodiment.

FIG. 4 is a diagram illustrating another exemplary configuration of the measuring system (exemplary configuration in which power of measurement light does not need to be measured) using the nonlinearity measuring device 1 according to the present embodiment. A reference optical fiber 3 with already-known optical nonlinearity or an already-known $A_{eff}$ is inserted between the nonlinearity measuring device 1 and the optical fiber 2 to be measured in the exemplary configuration illustrated in FIG. 4 instead of measuring power of laser light incident into the specific core 21. That is, in the exemplary configuration illustrated in FIG. 4, the reference optical fiber 3 is inserted as a common optical path configuring part of the optical path between the laser light source 11 and the first end 2a of the optical fiber 2 to be measured and configuring part of the optical path between the detecting unit 12 and the first end 2a. The nonlinearity measuring device 1 illustrated in FIG. 4 does not include a component for monitoring incident light power (transmission path configured of the optical fiber 18). The reference optical fiber 3 includes one or more cores 31, and a single cladding 39 surrounding the cores 31. It is preferable that the composition of the cores 31 of the reference optical fiber 3 be substantially the same as the composition of the cores 21 and 22 of the optical fiber 2 to be measured.

In the exemplary configuration illustrated in FIG. 4, laser light outputted from the laser light source 11 is incident into the specific core 21 from the first end 2a of the optical fiber 2 to be measured via the reference optical fiber 3. On the other hand, Brillouin backscattering light emitted from the specific core 21 at the first end 2a of the optical fiber 2 to be measured is received by the detecting unit 12 via the reference optical fiber 3. Further, Brillouin backscattering light caused in the reference optical fiber 3 is also received by the detecting unit 12. By the analyzing unit 13, the optical nonlinearity of the optical fiber 2 to be measured is then determined as a relative value for the already-known optical nonlinearity of the reference optical fiber 3 on the basis of the ratio of the intensities of the pieces of Brillouin backscattering light caused in each of the reference optical fiber 3 and the optical fiber 2 to be measured.

REFERENCE SIGNS LIST

1 . . . Nonlinearity measuring device; 2 . . . Optical fiber to be measured; 2a . . . First end; 2b . . . Second end; 3 . . . Reference optical fiber; 11 . . . Laser light source; 12 . . . Detecting unit; 13 . . . Analyzing unit; 14 . . . Optical coupler; 15 to 17 . . . Optical fiber; 21, 22 . . . Core; 29 . . . Cladding; 31 . . . Core; and 39 . . . Cladding.

The invention claimed is:

1. A nonlinearity measuring method for measuring optical nonlinearity of an optical fiber to be measured comprising a first end, a second end opposing the first end, a plurality of cores which extend between the first end and the second end and have mutually coupled waveguide modes, and a single cladding surrounding the plurality of cores, the nonlinearity measuring method comprising:
preparing a laser light source and a light detector each optically connected to any one specific core among the plurality of cores at the first end of the optical fiber to be measured;
inputting laser light from the laser light source into the specific core at the first end;
determining an intensity of a specific wavelength component caused by optical nonlinearity of the optical fiber to be measured among wavelength components included in light received by the light detector after receiving light emitted from the specific core at the first end in response to the laser light incident into the specific core by the light detector; and
determining optical nonlinearity of the optical fiber to be measured on the basis of the intensity of the specific wavelength component.

2. The nonlinearity measuring method according to claim 1, further comprising: measuring power of the laser light incident into the specific core, wherein
the determining the optical nonlinearity determines the optical nonlinearity on the basis of the intensity of the specific wavelength component and the power of the laser light.

3. The nonlinearity measuring method according to claim 1, wherein,
in the inputting, the laser light is incident into the specific core via a reference optical fiber having known optical nonlinearity as a common optical path configuring part of an optical path between the laser light source and the first end and configuring part of an optical path between the light detector and the first end,
in the determining the intensity, the light emitted from the specific core at the first end is received by the light detector via the reference optical fiber, and,
in the determining the optical nonlinearity, optical nonlinearity of the optical fiber to be measured is determined as a relative value for the known optical nonlinearity of the reference optical fiber.

4. The nonlinearity measuring method according to claim 1, wherein,
in the inputting, pulse laser light as the laser light is incident into the specific core at the first end,
in the determining the intensity, a temporal change in the intensity of the specific wavelength component is determined, and,
in the determining the optical nonlinearity, optical nonlinearity is determined at each position in a longitudinal direction of the optical fiber to be measured on the basis of the temporal change in the intensity of the specific wavelength component.

5. A nonlinearity measuring device for measuring optical nonlinearity of an optical fiber to be measured comprising a first end, a second end opposing the first end, a plurality of cores which extend between the first end and the second end and have mutually coupled waveguide modes, and a single cladding surrounding the plurality of cores, the nonlinearity measuring device comprising:
a laser light source optically connected to any one specific core among the plurality of cores at the first end of the optical fiber to be measured and emitting laser light to be incident into the specific core at the first end;
a light detector optically connected to the specific core at the first end of the optical fiber to be measured, the light detector determining an intensity of a specific wavelength component caused by optical nonlinearity of the optical fiber to be measured among wavelength components included in received light after receiving light emitted from the specific core at the first end in response to the laser light incident into the specific core; and
an analyzer that determines optical nonlinearity of the optical fiber to be measured on the basis of the intensity of the specific wavelength component.

* * * * *